United States Patent [19]

Rashkovsky

[11] Patent Number: 4,665,768
[45] Date of Patent: May 19, 1987

[54] POWER TAKE-OFF SHAFT SHIELD ASSEMBLY

[75] Inventor: Alexander Rashkovsky, Skokie, Ill.

[73] Assignee: J. I. Case Company, Racine, Wis.

[21] Appl. No.: 876,744

[22] Filed: Jun. 20, 1986

[51] Int. Cl.⁴ .............................................. F16P 1/00
[52] U.S. Cl. .................................. 74/609; 74/606 R; 464/176
[58] Field of Search .............. 74/609, 606 R; 464/176

[56] References Cited

U.S. PATENT DOCUMENTS 2,967,432 1/1961 Du Shane et al. ................ 74/609 X
4,008,583 2/1977 Davis ............................... 74/609 X
4,553,950 11/1985 Teich ................................ 74/609 X Primary Examiner—Richard J. Scanlan, Jr.
Attorney, Agent, or Firm—Peter N. Jansson

[57] ABSTRACT

A tractor power take-off shaft shield assembly having a pair of spaced side plates on either side of the shafts, a movable top plate which slideable between an extended position covering the shafts and a retracted position exposing the shafts, and locking devices adjustably holding the movable top plate in position across the side plates. This shield assembly improves accessibility to and visibility of power take-off shafts and ease of operation in attachment and detachment of implements.

15 Claims, 3 Drawing Figures

POWER TAKE-OFF SHAFT SHIELD ASSEMBLY

FIELD OF THE INVENTION

This invention is related generally to shields for rotating shafts on tractors for driving implements attached to such tractors and, more particularly, to adjustable shields for tractor power take-off shafts.

BACKGROUND OF THE INVENTION

Farm tractors typically include one or two power take-off shafts extending rearwardly from a vertical wall of the tractor in a position to engage the drive shaft of a trailing implement. Safety shields are provided as regular equipment on such tractors to protect the operator from inadvertent contact with a rotating power take-off shaft or the portion of a drive shaft attached to the power take-off shaft or immediately adjacent thereto.

While such shields serve the intended function, they also make the power take-off shaft or shafts less accessible to the point that they are often considered "in the way" during attachment and detachment of a trailing implement with the tractor and its power take-off shaft. Power take-off shaft shields often have the further disadvantage of shielding the shafts from the view of the operator. Such shields are frequently removed and discarded, with the obvious attendant disadvantages.

In the prior art, there have been various attempts to make shields which may be removed or adjusted temporarily to accommodate the attachment or detachment of trailing implements. Among such shields of the prior art are those disclosed in the following U.S. Pat. Nos.:

4,442,742 (Hartman)
Re. 30,152 (Davis)
3,733,854 (Young et al.)
3,504,508 (Bornzin)
3,389,763 (Meinert)
2,967,432 (Du shane et al.)
2,858,680 (Harrington)
2,696,089 (Heth)
2,618,980 (Cook)
2,410,503 (Johnson)

Certain adjustable shield assemblies may be tilted upwardly for the purpose of making the power take-off shafts more readily accessible for attachment and detachment of implements. Such tilting shield assemblies do not make the power take-off shafts sufficiently accessible. Operators, who stand beside the power take-off shafts and the shield assemblies during attachment and detachment of implements, tend to be in a position requiring them to look down on such equipment. Tilting of the shield assembly usually does little to improve accessibility and visibility of the power take-off shafts from that vantage point.

Despite various prior improvements, power take-off shaft shields are still considered, by those who use such equipment in the field, to be the cause of substantial accessibility and visibility problems during attachment and detachment of trailing implements. It is to the solution of these problems that this invention is addressed.

SUMMARY OF THE INVENTION

This invention is an improved power take-off shaft shield assembly overcoming certain problems and deficiencies of shields of the prior art, including those mentioned above. The shield assembly is of the type on a tractor having one or more power take-off shafts protruding from a substantially vertical wall of the tractor, usually in a rearward direction.

The shield assembly of this invention includes a pair of spaced side plates projecting from the tractor wall, one on either side of the power take-off shaft or shafts, a movable horizontal top plate extending between the side plates and slideably engaged therewith, and locking means adjustably securing the movable top plate to the side plates.

The top plate is slideably movable between an extended position fully covering the shafts and a retracted position exposing the operational ends of the shafts to operators standing beside and looking down on such equipment. When it is necessary to attach an implement to a power take-off shaft, the locking means are loosened and the movable top plate is slid to its retracted position. After the implement drive shaft is attached to the power take-off shaft, the movable top plate is slid back to its extended position and the locking means are tightened to secure the movable top plate firmly in its extended position.

The side plates have parallel upper edges extending outwardly from proximal ends near the tractor wall to distal ends away from the tractor wall. Such parallel upper edges are preferably turned in toward each other such that each has upper and lower surfaces parallel to the movable top plate. Such turned-in edges serve to reinforce the side plates and, in preferred embodiments, provides an edge which may readily be engaged by the locking means. The movable top plate is preferably positioned along one surface of such turned-in upper parallel edges of the side plates, most preferably along the upper surfaces thereof.

The locking means is preferably clamping means, most preferably a pair of clamping means each of which includes a fixed portion, a movable portion, and means to draw the movable portion toward the fixed portion. The fixed portion is mounted to the movable top plate in position along one of the turned-in edges. The movable portion extends through the fixed portion, preferably in threaded engagement therewith, which provides the means to draw the two together. The movable portion of the locking means extends through the movable plate and past the turned-in edge to engage the opposite surface of the turned-in edge, most preferably the lower surface.

When the movable and fixed portions are drawn together, they sandwich the turned-in edge against the movable top plate. Such clamping means is preferably a bolt device connected to a convenient finger-operable knob which is readily accessible on top of the shield assembly.

In preferred embodiments, stop means is provided on at least one of the side plates in position to be engageable with the movable top plate to define the extended position thereof. Most preferably, stops are affixed at the distal ends of both of the turned-in edges.

The movable top plate preferably has inner and outer edges extending between the side plates, the outer edge being farther from the tractor wall than the inner edge. The shield assembly also preferably includes a fixed top plate permanently located near the tractor wall above where the power take-off shafts first protrude from such wall.

Such fixed top plate extends between the side plates, and extends from an edge which is immediately adjacent to the tractor wall to an edge which is away from the tractor wall and which, when the movable top plate is in its extended position, is near the inner edge of the movable top plate. Such fixed top plate is preferably secured to the side plates at a position below the upper turned-in edges, such that the movable top plate may slide over the fixed top plate to its retracted position.

The power take-off shaft of this invention, while simple and inexpensive in construction particularly when compared to shield assemblies of the prior art, provides greatly improved accessibility and visibility for the tractor operator and provides it in an easily operable form.

OBJECTS OF THE INVENTION

It is an object of this invention to provide an improved power take-off shaft shield assembly overcoming certain problems and disadvantages of the prior art.

Another object of this invention is to provide a power take-off shaft shield assembly which gives improved accessibility to the power take-off shaft or shafts when such accessibility is required.

Another object of this invention is to provide a power take-off shaft shield assembly which allows the operator to see the power take-off shaft or shafts easily during attachment or detachment of a trailing implement.

Another object of this invention is to provide a power take-off shaft shield assembly which may be adjusted easily between a covering position and an exposing position with respect to the shaft or shafts.

These and other important objects will be apparent from the following descriptions and from the drawings, wherein:

BRIEF DESCRIPTIONS OF THE DRAWINGS

DETAILED DESCRIPTION OF PREFERRED EMBODIMENTS

Figure 1:
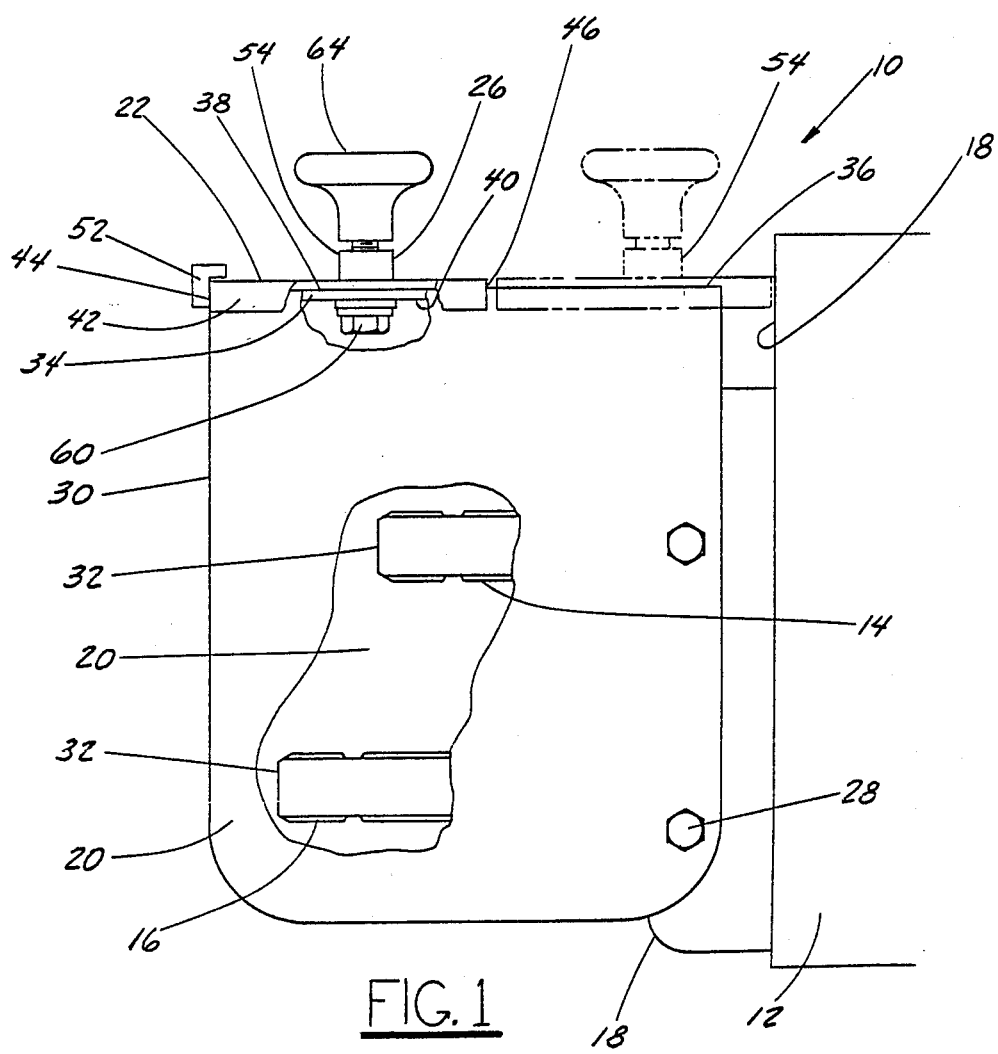
FIG. 1 is a partially cutaway side elevation of a preferred power take-off shaft shield assembly in accordance with this invention.

The figures illustrate a power take-off shaft shield assembly 10 which is a preferred embodiment of this invention. Shield assembly 10 is part of a tractor 12 which has a pair of power take-off shafts 14 and 16 protruding from a vertical wall 18.

Shield assembly 10 includes a pair of spaced side plates 20, a movable top plate 22, a fixed top plate 24, and a pair of threaded locking members 26 for adjustably securing movable top plate 22 to side plates 20.

Side plates 20 project from vertical wall 18 and are themselves vertical and parallel to one another. They are attached to tractor 12 by means of bolts 28. Side plates 20 project to distal vertical edges 30 which extend beyond the ends 32 of shafts 14 and 16.

Side plates 20 have parallel upper edges 34 each of which extends from a proximal end 36 to a distal end (not shown) which forms a part of distal vertical edge 30. Parallel upper edges 34 are turned in toward each other such that each has an upper surface 38 and a lower surface 40, both of which are horizontal and parallel to movable top plate 22.

Movable top plate 22 extends between side plates 20 and over parallel upper edges 34 of side plates 20. Movable top plate 22 has side edges 42 which are turned downwardly just beyond parallel upper edges 34 of side plates 20, such that movable top plate 22 rests in position over side plates 20.

Movable top plate 22 is slideably engaged with upper surfaces 38 of upper edges 34 of side plates 20. And, movable top plate 22 is slideably movable between an extended position, as illustrated by full lines in FIG. 1, in which it covers shafts 14 and 16, and a retracted position, as illustrated by phantom lines in FIG. 1, in which it exposes shafts 14 and 16.

Movable top plate 22 has an outer edge 44 and an inner edge 46 which extend between side plates 20. Outer edge 44 is aligned with distal vertical edges 30 of side plates 20 and the distal ends of parallel upper edges 34 when movable top plate 22 is in its extended position. And, when movable top plate 22 is in its extended position, inner edge 46 is spaced from vertical wall 18 of tractor 12. When movable top plate 22 is moved to its retracted position, inner edge 46 is in contact with vertical wall 18, as illustrated by phantom lines in FIG. 1.

Figure 3:
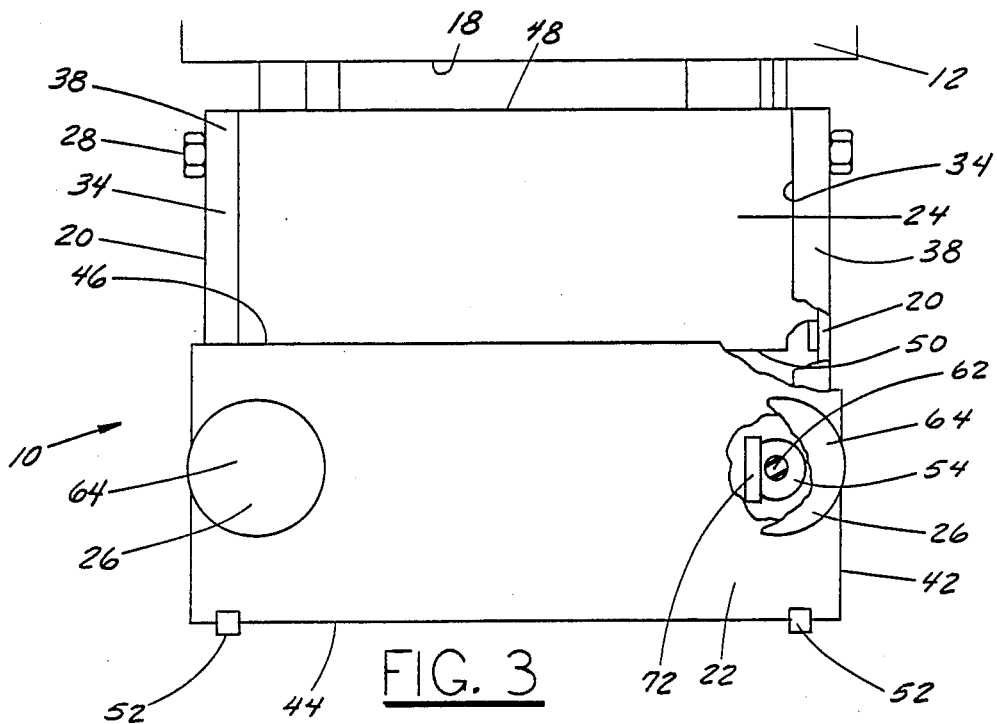
FIG. 3 is a partially cutaway top plan view of FIG. 2.
Figure 2:
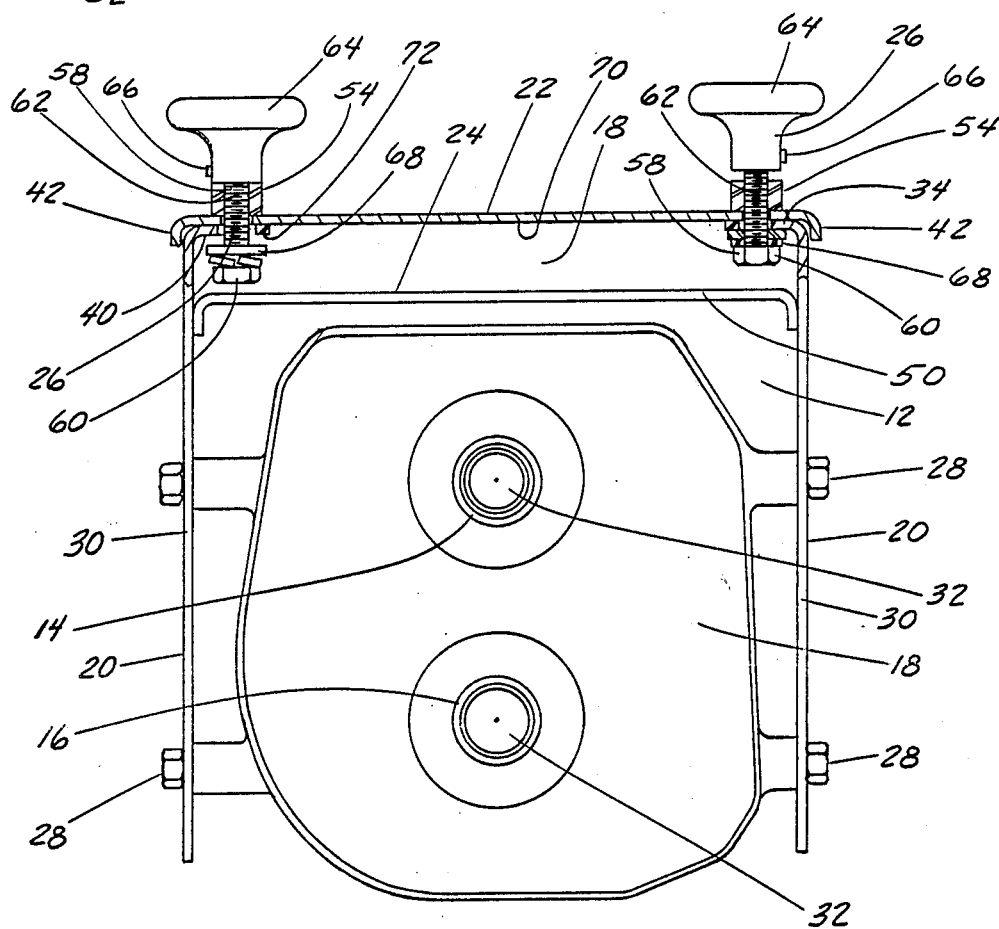
FIG. 2 is a partially sectional side view of FIG. 1.

Fixed top plate 24, shown in FIGS. 2 and 3, extends between side plates 20 and has a wall-adjacent edge 48 and a wall-remote edge 50. Wall-remote edge 50 is near inner edge 46 when movable top plate 22 is in its extended position. In such position, movable top plate 22 overlaps fixed top plate 24 slightly, and movable and fixed top plates 22 and 24 cover shafts 14 and 16 completely. Fixed top plate 24 is secured to side plates 20 at a level below the level of upper edges 34, such that the sliding adjustment of movable top plate 22 to its retracted position is unobstructed.

As shown in FIGS. 1 and 3, stop members 52 are rigidly attached to the distal ends of each of the upper edges 34 of side plates 20. Stop members 52 are positioned to be engageable with outer edge 44 of movable top plate 22 to define the extended position thereof, and to prevent movable top plate 22 from being inadvertently slid away from shield assembly 10.

Threaded locking members 26 each include a fixed inwardly-threaded member 54, a movable member having a bolt 58 with a head 60 and a threaded shank 62 to which a knob 64 is secured non-rotatably by means of a set screw 66. And a pair of washers 68 about shank 62. Each of the two fixed inwardly-threaded members 54 is rigidly mounted on top of movable top plate 22 at a position about midway between outer edge 44 and inner edge 46 and just inside one of the parallel upper edges 34 of side plates 20. Shank 62 extends through movable top plate 22 and is in threaded engagement with fixed inwardly-threaded member 54. The positioning of the two threaded locking members 26 is such that the movable members thereof can engage lower surface 40 of upper edges 34 of side plates 20.

Fixed to the lower surface 70 of movable top plate 22, in positions immediately adjacent to shank 62 and on the sides thereof opposite the positions of upper edges 34, are bearing strips 72. Bearing strips 72 are of the same thickness as upper edges 34. Bearing strips 72 are positioned such that washer 68 engages a bearing strip 72 and an upper edge 34 at the same time without severe tilting.

When fixed threaded members 54 and movable threaded members 58 are tightened, as illustrated on the right side of FIG. 2, the upper edge 34 of a side member 20 and movable top plate 22 are sandwiched together. When both of the threaded locking members 26 are tightened in this manner, movable top plate 22 is held firmly in place.

Movable top plate 22 may be loosened easily by grasping knobs 64 and turning them slightly to loosen locking members 26. Movable top plate 22 may then be slid to the position indicated by phantom lines in FIG. 1, thus making shafts 14 and 16 more easily accessible and visible from above such that they may be connected readily to the implement which will be powered by one of the such shafts.

The shield assembly of this invention may be made using steel plates or other well-known materials. Locking members 26 may be made of a variety of standard fastening devices.

Many variations are possible in the form and location of the locking members. Instead of being mounted on movable top plate 22, the locking members could be secured to side plates 20 or some other portion of shield assembly 10. It is only necessary that they be able to secure and release the movable top plate. While it is preferred to have a pair of locking members, a single locking member or more than two locking members could be used.

Fixed top plate 24 is preferably either welded to side plates 20 or attached by fasteners. Stop members 52 are preferably attached to upper edges 34 by welding.

The dimensions, relative dimensions, and positions of the parts of shield assembly 10 can vary considerably. Fixed top plate 24, instead of being at a level well below the level of movable top plate 22, can be at a higher level provided slots or other accommodations are made such that fixed top plate 24 will not interfere with locking members 26 as movable top plate 22 moves to its retracted position.

While the principles of this invention have been described in connection with specific embodiments, it should be understood clearly that these descriptmovable top plate 22, can be at a higher level provided slots or other accommodations are made such that fixed top plate 24 wilmovable top plate 22, can be at a higher level provided slots or other accommodations are made such that fixed top plate 24 will not interfere with locking members 26 as movable top plate 22 moves to its retracted position.

While the principles of this invention have been described in connection with specific embodiments, it should be understood clearly that these descriptions are made only by way of example and are not intended to limit the scope of the invention.

What is claimed is:

1. A power take-off shaft shield assembly of the type on a tractor with the power take-off shaft(s) protruding from a substantially vertical wall of the tractor, comprising:
   a pair of spaced side plates projecting from the wall one on either side of the shaft(s), the side plates having parallel upper edges extending outwardly from proximal ends near the wall to distal ends away from the wall;
   a movable horizontal top plate extending between the side plates and slideably engaged with said upper edges, said top plate movable in its horizontal orientation between an extended position covering the shaft (s) and a retracted position exposing the shaft(s); and
   means adjustably securing the movable top plate to the side plates.

2. The shield assembly of claim 1 wherein:
   the upper edges are turned in toward each other such that each has upper and lower surfaces substantially parallel to the movable top plate; and
   the securing means engages the turned-in edges.

3. The shield assembly of claim 2 wherein the movable top plate is positioned along one surface of the turned-in edges and the securing means includes at least one clamping means, each clamping means comprising:
   a fixed portion mounted to the movable top plate in position along one of the turned-in edges;
   a movable portion extending through the movable top plate past the turned-in edge to engage the opposite surface of the turned-in edge; and
   means to draw the movable portion toward the fixed portion to sandwich the turned-in edge against the movable top plate.

4. The shield assembly of claim 3 wherein the drawing means comprises a finger-operable knob.

5. The shield assembly of claim 4 wherein the movable top plate is along the upper surfaces of the turned-in edges.

6. The shield assembly of claim 3 further comprising a stop member affixed to the distal end of at least one of the turned-in edges.

7. A power take-off shaft shield assembly of the type on a tractor with the power take-off shaft(s) protruding from a substantially vertical wall of the tractor, comprising:
   a pair of spaced side plates projecting from the wall, one on either side of the shaft(s), the side plates having parallel upper edges extending outwardly from proximal ends near the wall to distal ends away from the wall;
   a movable top plate extending between the side plates and slideably engaged therewith, said top plate movable between an extended position covering the shaft(s) and a retracted position exposing the shaft(s);
   means adjustably securing the movable top plate to the side plates; and
   stop means on at least one of the side plates and engageable with the movable top plate to define the extended position thereof.

8. A power take-off shaft shield assembly of the type on a tractor with the power take-off shaft(s) protruding from a substantially vertical wall of the tractor, comprising:
   a pair of spaced side plates projecting from the wall. one on either side of the shaft(s), the side plates having parallel upper edges extending outwardly from proximal ends near the wall to distal ends away from the wall;
   a movable top plate extending between the side plates and slideably engaged therewith. said top plate movable between an extended position covering the shaft(s) and a retracted position exposing the shaft(s), the movable top plate having inner and outer edges extending between the side plates, the outer edge being farther from the wall;
   a fixed top plate extending between the side plates from a wall-adjacent edge of said fixed top plate to a wall remote edge thereof which is near the inner edge of the movable top plate when the movable top plate is in the extended position; and;
   means adjustably securing the movable top plate to the side plates.

9. The shield assembly of claim 8 wherein the fixed top plate is secured to the side plates at a position below the upper edges thereof, such that the movable top plate may slide over the fixed top plate to the retracted position.

10. The shield assembly of claim 9 wherein:

the upper edges are turned in toward each other such that each has upper and lower surfaces substantially parallel to the movable top plate; and the securing means engages the turned-in edges.

11. The shield assembly of claim 10 wherein the movable top plate is positioned along one surface of the turned-in edges and the securing means includes at least one clamping means, each clamping means comprising:

a fixed portion mounted to the movable top plate in position along one of the turned-in edges;

a movable portion extending through the movable top plate past the turned-in edge to engage the opposite surface of the turned-in edge; and means to draw the movable portion toward the fixed portion to sandwich the turned-in edge against the movable top plate.

12. The shield assembly of claim 11 wherein the drawing means comprises a finger-operable knob.

13. The shield assembly of claim 12 wherein the movable top plate is along the upper surfaces of the turned-in edges.

14. The shield assembly of claim 9 further comprising a stop means on at least one of the side plates and engageable with the movable top plate to define the extended position thereof.

15. The shield assembly of claim 11 further comprising a stop member affixed to the distal end of at least one of the turned-in edges.

* * * * *